United States Patent [19]

Pellizzon et al.

[11] 4,139,398
[45] Feb. 13, 1979

[54] PROCESS FOR PREPARING A RED IRON OXIDE PIGMENT

[75] Inventors: Tullio Pellizzon, Paderno Dugnano (Milan); Luigi Piccolo; Peter Schwarz, both of Milan, all of Italy

[73] Assignee: Euteco S.p.A., Sassari, Italy

[21] Appl. No.: 856,769

[22] Filed: Nov. 29, 1977

[30] Foreign Application Priority Data

Jan. 11, 1977 [IT] Italy ............................... 19154 A/77

[51] Int. Cl.$^2$ ............................................... C09C 1/24
[52] U.S. Cl. .................................... 106/304; 423/633; 260/580
[58] Field of Search ................. 106/304; 423/432, 433; 260/580, 575

[56] References Cited

U.S. PATENT DOCUMENTS

| | | | |
|---|---|---|---|
| 1,793,942 | 2/1931 | Laux | 260/580 |
| 2,273,101 | 2/1942 | Haberland | 106/304 |
| 2,696,426 | 12/1954 | Marcot | 423/633 |
| 3,755,554 | 8/1973 | Lailach et al. | 423/633 |

Primary Examiner—Winston A. Douglas
Assistant Examiner—J. V. Howard
Attorney, Agent, or Firm—J. Harold Nissen

[57] ABSTRACT

This invention describes a process for preparing a red iron oxide pigment from inorganic ferrous salts and aromatic nitro compounds.

16 Claims, No Drawings

PROCESS FOR PREPARING A RED IRON OXIDE PIGMENT

This invention relates to the preparation of red pigment of iron oxide from inorganic ferrous salts by a process which includes the simultaneous reduction, by these ferrous salts, of organic aromatic nitro-derivatives.

Reduction of reducible nitrogen aromatic compounds by means of metallic iron in an acid environment, with the production of the corresponding amines and a precipitate consisting of iron oxides with pigmentary characteristics, is known. However, such processes suffer from disadvantages deriving from equipment corrosion due to the physical and chemical corrosive strength of the solutions and suspensions involved.

It is also known to be possible to produce aromatic amines by the reduction of reducible nitrogen aromatic compounds by ferrous salts. However, using such processes, it has not been possible to find the conditions which lead to the precipitation of iron oxides with satisfactory pigmentary characteristics, nor in particular, has it been possible to find those conditions which would enable a particular required pigment to be produced reliably and reproducibly.

These disadvantages can be overcome by the process according to the present invention, in which the reduction of aromatic nitro-derivatives (also referred to as 'nitro-compounds') by ferrous salts is accompanied with the production of red iron oxide of high pigmentary characteristics.

More particularly, the present invention relates to the preparation of a red $Fe_2O_3$ iron oxide pigment of spherical form, with an average particle size of the order of 0.1-0.4 microns, starting from ferrous sulphate, an inorganic base and an organic aromatic nitro-derivative, by a process comprising:

(a) in a first stage, bringing into contact aqueous ferrous sulphate solution, aqueous alkali metal hydroxide solution and an aromatic nitro-derivative, with a molar ratio of alkali metal hydroxide to ferrous sulphate equal to or less than 1:1 and a molar ratio of moles of said alkaline hydroxide to equivalents of the aromatic nitro-derivative equal to or less than 12:1, and operating at a temperature between 85° C. and the boiling point of the reaction mixture at atmospheric pressure and at a pH equal to or less than 7.5 and for a time at least equal to the time required for forming a suspension of nuclei with a solids content, evaluated as $Fe_2O_3$, of not greater than 40g/liter;

(b) in a second reaction stage, mixing together an aqueous solution of ferrous sulphate, an organic nitro-derivative and iron oxide pigment nuclei from the first stage, and while operating at a temperature between 85° C. and the boiling point of the reaction mixture at atmospheric pressure feeding into the mixture aqueous alkali metal hydroxide up to a maximum of approximately 2 moles for each mole of ferrous sulphate, the ratio of moles of alkali metal hydroxide to equivalents of the organic nitro-derivative being equal to or less than about 12:1, said feed of aqueous alkali metal hydroxide being gradual in order to maintain in the reaction medium a pH between 6.0 and 7.5, whereby a suspension of $Fe_2O_3$ iron oxide pigment with a solids content, evaluated as $Fe_2O_3$, of not greater than 110g/liter is formed, the amount of the nuclei from the first stage being furthermore 3 to 15 parts by weight of every 100 parts by weight of the precipitate in the second stage;

(c) recovery the pigmentary iron oxide and resultant aromatic amine from the reaction products of the second stage.

The inorganic salt used for the purposes of the present invention is ferrous sulphate. It is possible to use pure ferrous sulphate, or a mixture which contains ferrous sulphate such as one deriving from the production of titanium dioxide by the sulphate process. Such mixtures notably contain preponderant quantities of ferrous sulphate in its heptahydrate form and smaller quantities of other sulphates such as magnesium, aluminium, manganese, chromium and titanyl sulphate.

The preferred alkali metal hydroxide is sodium hydroxide, it being the cheapest.

The nitro-derivatives used for the purposes of the present invention are those organic aromatic compounds which contain one or more nitro groups bonded to an aromatic ring. The compound can have one or more aromatic rings, and in the latter instance they can be condensed or not.

Preferably the nitro-derivative is liquid under the operating conditions. It will usually be selected from those defined by the following general formulae:

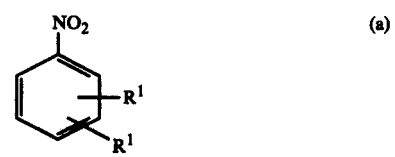

$R^1$ is the same or different and represents a hydrogen atom, alkyl group, halogen atom or one of the groups: —OH, $OCH_3$, $-NH_2$, —COOH, $-SO_2OH$ and $-SO_2NH_2$;

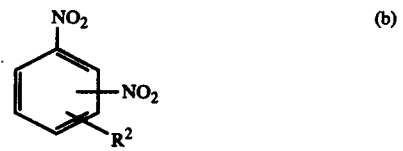

where $R^2$ represents a hydrogen atom or an alkyl group;

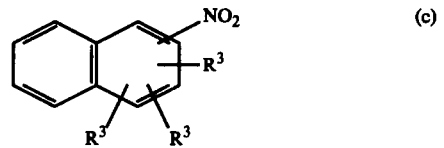

where $R^3$ represents a hydrogen or halogen atom or one of the groups: $-NO_2$, $-NH_2$, —OH, or $-SO_2OH$;

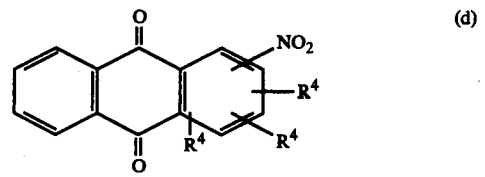

where $R^4$ represents a hydrogen or halogen atom or an $-SO_2OH$ group.

Of these nitro-derivatives, the following are preferred for the purposes of the present invention: nitrobenzene, p-nitrotoluene, o-nitrotoluene, p-chloronitrobenzene, o-chloronitrobenzene, 2,4-dimethylnitrobenzene, o-nitroanisole, p-nitrobenzoic acid, m-nitrobenzene sulphonic acid, p-nitroaniline and 2,4-dinitrotoluene.

The three principal steps of the process according to the present invention will now each be considered in greater detail.

Stage a — Preparation of the nuclei

In the nuclei preparation stage, the molar ratio of alkali metal hydroxide to ferrous sulphate is equal to or less than 1:1, and generally 0.3:1 to 1:1.

In this respect, it has been found that the formation of the $Fe_2O_3$ iron oxide nuclei proceeds favourably in an environment in which only 50% or less of the iron present in the solution has been precipitated.

On the other hand, it is usually inconvenient to operate with molar ratios of alkali metal hydroxide to ferrous sulphate less than 0.3:1, both because nuclei are obtained of unsuitable size for the growth of the pigment, and for process economy reasons. Unsatisfactory results are obtained when attempting to operate with a ratio exceeding 1:1 and up to 2:1, whereas generally there is no formation at all of nuclei when the ratio exceeds 2:1. Best results are obtained with molar ratios of alkali metal hydroxide to ferrous sulphate of 0.4:1 to 0.6:1.

In preparing the nuclei, the reaction takes place in the presence of an aromatic nitro-derivative, preferably one chosen from those heretofore defined. In particular, the ratio of moles of alkali metal hydroxide to equivalents of the aromatic nitroderivative (it will be understood throughout this specification that the nitro compound can have more than one reactive group and due allowance must be made when calculating molar ratios) is equal to or less than about 12:1. The quantity of aromatic nitro-derivative is thus at least to the stoichiometric quantity required for the oxidation of the precipitated iron. It is, however, possible to use quantities of nitro-derivative which are larger than the stoichiometric value, in order to complete the reaction. In this case the unconverted aromatic nitro-derivative passes to the subsequent pigment preparation stage, together with the suspension of nuclei.

In an analogous way may be reutilized the ferrous sulphate which remains unconverted in the nuclei preparation stage.

The degree of dilution of the medium in which stage (a) of the process is carried out is important, and in practice the conditions are controlled such that the solids content, evaluated as $Fe_2O_3$, in the produced suspension is not greater than 40g/liter. The lower concentration limit is not critical, but it is generally desirable not to fall below 5g/liter, for economy reasons. The best results are obtained when the solids content of the pulp is of the order of 10–15 g/liter.

In preparing the nuclei, the reaction is carried out at a temperature varying generally from 85° C. to the boiling point of the reaction mixture at atmospheric pressure (typically 102°–103° C.), the preferred temperature being between 95° C. and said boiling point.

The pH of the medium is generally between 6 and 7.5, and best results are obtained when operating at a pH of the order of 6.5–7.0.

The progress of the reaction typically involves the initial formation of a gelatinous iron hydroxide, its intermediate conversion into a dark coloured crystalline product with magnetic characteristics, to which the structure $FeO.Fe_2O_3$ is generally attributed, followed by the formation of red $Fe_2O_3$ iron oxide nuclei.

The time required for forming the nuclei depends on the temperature chosen for the reaction, and varies generally from 0.5 to 3 hours.

The reactions leading to the formation of the nuclei are believed to be the following:

$$18FeSO_4 + 36MOH \rightarrow 18Fe(OH)_2 + 18M_2SO_4 \quad \text{(I)}$$

$$18Fe(OH)_2 + 2ArNO_2 \rightarrow 6(FeO.Fe_2O_3) + 2ArNH_2 + 16H_2O \quad \text{(II)}$$

$$6(FeO.Fe_2O_3) + ArNO_2 + H_2O \rightarrow 9Fe_2O_3 + ArNH_2 \quad \text{(III)}$$

where M is an alkali metal, preferably sodium, and Ar is the aryl moiety of the aromatic nitro compound.

Reaction (I) is practically instantaneous, whereas reactions (II) and (III) require a relatively long time.

The overall reaction is as follows:

$$6FeSO_4 + 12NaOH + ArNO_2 \rightarrow$$
$$3Fe_2O_3 + ArNH_2 + 6Na_2SO_4 + 5H_2O$$

On completion of the reaction, nuclei are obtained on which the pigment particles are developed in the subsequent stage.

Stage b — Pigment preparation

In accordance with the present invention, a mixture is prepared consisting of ferrous sulphate in aqueous solution, an aromatic nitro-derivative and nuclei obtained in the first reaction stage.

The nitro-derivative is preferably chosen from those already defined, and may be the same as or different from that used in the nuclei preparation stage.

The nuclei themselves may be used as such, but preferably the suspension thereof is used because in this manner the ferrous sulphate and any nitro-derivative unconverted in the first process stage are recovered.

The mixture is maintained at a temperature between 85° C. and its boiling point at atmospheric pressure (102°–103° C.), under agitation, and aqueous alkali metal hydroxide is gradually added so as to maintain the pH of the medium between 6.0 and 7.5.

Heating of the mass continues after adding the alkali metal hydroxide until completion of precipitation of the red iron oxide pigment. Generally, the total reaction time varies from 2 to 4 hours. The maximum quantity of alkali metal hydroxide added is equal or approximately equal to that required for precipitating the iron, and consequently the maximum value of the molar ratio of alkali metal hydroxide to ferrous sulphate is approximately 2:1. Beyond this limit, the pH of the medium tends to increase undesirably. The minimum value of this ratio is typically of the order of 0.5:1. It is inconvenient to fall below this value both because of the poor utilisation of the ferrous sulphate and because the precipitate formed is insufficient for the growth of the nuclei up to the size required for the pigment. In all cases, optimum results are obtained when operating with a molar ratio of alkali metal hydroxide to ferrous sulphate of 2:1 or at least close to this value.

The quantity of nitro-derivative present in the reaction mixture must be at least equal to the stoichiometric quantity for the aforesaid reaction (IV). The maximum molar ratio of moles of alkali metal hydroxide to the number of nitro groups in the aromatic nitro-derivative is usually thus equal to 12:1. However, the operation may be carried out with an excess of aromatic nitro-derivative over the stoichiometric value, even though this gives rise to the problem of its separation from the other reaction products. Best results are obtained when operating in a pH range of 6.5-7.0 and a temperature range of 95° C. to the boiling point of the reaction mixture at atmospheric pressure.

The degree of dilution of the medium in which the operation takes place in the pigment preparation stage is important, and in practice the conditions are controlled such that the pigment suspension produced possesses a solids content, evaluated as $Fe_2O_3$, of not greater than 110 g/liter and more suitably 30 to 90 g/liter.

A further important factor in order to give correct growth of said nuclei up to the required size for the pigment is the amount of nuclei in relation to the quantity of pigment produced. More particularly, the conditions are controlled such that the quantity of nuclei produced in the first stage is 3 to 15 parts by weight and preferably 5 to 10 parts by weight for every 100 parts by weight of the pigment produced in the second stage.

Stage c — Separation of the reaction products

The reaction products obtained in the previous stage consist of a suspension of the pigment in a liquid mixture containing the aromatic amine corresponding to the nitro-derivative used, any unaltered nitro-derivative, and an aqueous solution containing dissolved alkaline sulphate and any unaltered ferrous sulphate.

The separation of this mixture into its individual constituents can be carried out by normal methods. For example, the organic constituents may be separated by stripping with steam. The residual suspension can be filtered to separate the pigment, and this latter washed with water, preferably acidified water, and then dried.

The residual solution may be processed to recover the inorganic salts contained therein.

As will be evident from the experimental examples given hereinafter, a pigment can thus be obtained which is red $Fe_2O_3$ iron oxide, in the form of spherical particles with an average sphere size of the order of 0.1-0.4 microns and a narrow particle size distribution. Such pigments have a high tinting strength when this value is evaluated in accordance with ASTM D 387-60.

Embodiments of the present invention will now be illustrated by way of example.

Example 1

Formation of the nuclei

Ferrous sulphate heptahydrate, obtained as a by-product in the production of titanium dioxide by the sulphate process and having the following composition expressed as percent by weight, is used:

$FeSO_4.7H_2O$ 88.5%; $MgSO_4.7H_2O$ 6.3%; $Al_2(SO_4)_3.18H_2O$ 0.3%; $TiOSO_4$ 0.1%; $MnSO_4.5H_2O$ 0.3%; free $H_2SO_4$ 0.5%; $CaSO_4.2H_2O$ 0.2%; free $H_2O$ 3.5%. Traces of $VOSO_4$ (50ppm) and $Cr_2(SO_4)_3$ (2ppm) are also present. 314 grams of the ferrous sulphate heptahydrate (containing 1 mole of ferrous sulphate) are dissolved in water to give a ferrous sulphate concentration of 0.68 moles/liter.

An aqueous solution containing 0.5 moles (20 g) of sodium hydroxide with a concentration of 5 moles/liter is added over a period of 10 minutes to said solution, which is heated to 95° C. and kept under agitation. Ferrous hydroxide precipitates in an amount corresponding to the amount of sodium hydroxide.

0.17 moles (21 grams) of nitrobenzene are added to the agitated suspension, and the temperature is maintained at 95° C. until red $Fe_2O_3$ iron oxide nuclei precipitate. The reaction passes through an intermediate phase in which a dark coloured crystalline product with magnetic properties forms. During the reaction the pH of the reaction mixture is around 6.5. The nuclei formation is complete 90 minutes after the addition of the nitrobenzene. The pulp obtained has a solids content, evaluated as $Fe_2O_3$, of 12.7 g/liter.

Pigment Formation 1256 grams of the said ferrous sulphate heptahydrate are dissolved in water to give a ferrous sulphate concentration of 0.67 moles/liter.

0.67 moles (82.5 g) of nitrobenzene are added to the solution and the mixture heated to 95° C. On reaching this temperature, the suspension obtained in the first stage is added, and feeding of aqueous sodium hydroxide solution at a concentration of 5 moles/liter is commenced. This feed is kept at a constant rate for 30 minutes while keeping the mass under agitation, to a total of 9.5 moles of sodium hydroxide.

The mass is then kept agitated at the temperature of 95° C. for a further 2 hours.

During all the pigment preparation operation the pH of the reaction mixture is at 6.5-7.0.

At the end of the reaction a suspension is obtained containing 41g/liter of solids content, evaluated as $Fe_2O_3$, and this suspension is distilled in a current of steam in order to separate the aniline produced.

The residue is filtered to separate the resultant red pigment, which is dried after washing under agitation with a 2% by weight aqueous solution of sulphuric acid.

The red pigment is $Fe_2O_3$ in the form of homogeneous spherical crystals with an average size of 0.21 microns and with a tinting strength (ASTM D 387-60) of 117, the commercial product SIOF C 1017 being given a value of 100.

Examples 2 to 4 and Comparative Examples 1 to 6

The nuclei formation is repeated as described under Example 1, but varying the operational parameters as given in Table 1. The following values are given in this Table:

the quantity (moles) and concentration (moles/liter) of the ferrous sulphate (this latter is identical with that of Example 1).

the quantity (moles) and concentration (moles/liter) of the aqueous sodium hydroxide added to the ferrous sulphate solution.

the quantity (moles) of nitrobenzene added to the ferrous hydroxide suspension.

the working temperature (0° C.).

The Table also gives the values for Example 1. The nuclei suspension obtained is used in the formation of the pigment, and Table 2 gives the conditions under which this operation takes place. The following are given in said Table:

the quantity (moles) and concentration (moles/liter) of the ferrous sulphate.

the quantity (moles) of nitrobenzene.

the quantity (moles) and concentration (moles/liter) of sodium hydroxide.

the working temperature (° C.).

the time during which the aqueous sodium hydroxide is fed (minutes).

the amount of the nuclei as a percentage of the final pigment by weight (n/p.100).

TABLE 1

| Example (E) or Comparative Example (CE) | FeSO$_4$ (moles) | FeSO$_4$ (moles/l) | NaOH (moles) | NaOH (moles/l) | Nitrobenzene (moles) | Temperature (° C) |
|---|---|---|---|---|---|---|
| E1  | 1 | 0.68 | 0.5 | 5 | 0.17 | 95 |
| E2  | 1 | 0.68 | 0.5 | 5 | 0.17 | 95 |
| E3  | 1 | 0.68 | 0.5 | 5 | 0.17 | 102 |
| CE1 | 1 | 0.68 | 0.5 | 5 | 0.17 | 80 |
| CE2 | 1 | 0.68 | 0.5 | 5 | 0.17 | 95 |
| CE3 | 1 | 0.68 | 0.5 | 5 | 0.17 | 95 |
| CE4 | 1 | 0.68 | 0.5 | 5 | 0.17 | 95 |
| CE5 | 1 | 0.68 | 0.2 | 5 | 0.17 | 95 |
| CE6 | 1 | 0.68 | 1.5 | 5 | 0.17 | 95 |
| CE7 | 1 | 0.68 | 0.5 | 5 | 0.17 | 95 |

TABLE 2

| EXAMPLE (E) or COMPARATIVE EXAMPLE (CE) | FeSO$_4$ (moles) | FeSO$_4$ (moles/l) | Nitrobenzene (moles) | NaOH (moles) | NaOH (moles/l) | Temp. (° C) | Time (min.) | n/p.10 |
|---|---|---|---|---|---|---|---|---|
| E1  | 4 | 0.68 | 0.67 | 9.5 | 5 | 95  | 30 | 5.25 |
| E2  | 4 | 0.68 | 0.80 | 9.5 | 5 | 95  | 30 | 5.25 |
| E3  | 4 | 0.68 | 0.67 | 9.5 | 5 | 102 | 30 | 5.25 |
| CE1 | 4 | 0.68 | 0.67 | 9.5 | 5 | 80  | 30 | 5.25 |
| CE2 | 4 | 0.68 | 0.67 | 9.5 | 5 | 95  | 5  | 5.25 |
| CE3 | 4 | 0.68 | 0.67 | 9.5 | 5 | 95  | 60 | 5.25 |
| CE4 | 4 | 2.0  | 0.67 | 9.5 | 5 | 95  | 30 | 5.25 |
| CE5 | 4 | 0.68 | 0.67 | 9.8 | 5 | 95  | 30 | 2.05 |
| CE6 | 4 | 0.68 | 0.67 | 8.5 | 5 | 95  | 30 | 17.6 |
| CE7 | 4 | 0.68 | 0.5  | 9.5 | 5 | 95  | 30 | 5.25 |

Comparative Example 1 is a comparison in that nuclei formation and pigment formation is carried out outside the indicated temperature limits.

Comparative Examples 2 and 3 are comparisons in that for pigment formation the aqueous sodium hydroxide was fed at too high a rate in the first case and at too slow a rate in the second case, such that the pH was brought outside the indicated limits.

Comparative Example 4 is also a comparison in that pigment formation took place in a concentrated solution such that a suspension was produced with an excessively high solids content.

Comparative Examples 5 and 6 are also comparisons in that the molar ratio of sodium hydroxide to ferrous sulphate is outside the indicated limits for nuclei formation, and in that the amount of nuclei used relative to the pigment produced is outside the indicated limits.

Comparative Example 7 is also a comparison in that the amount of nitrobenzene used in the second stage is less than the stoichiometric quantity for the aforesaid reaction (IV).

The results of the Examples (other than Example 1 discussed above) and of the Comparative Examples are as follows:

in Example 2 a red Fe$_2$O$_3$ iron oxide pigment was obtained with a tinting strength of 118, in the form of uniform spherical particles of an average size of 0.205 microns;

in Example 3 a red Fe$_2$O$_3$ iron oxide pigment was obtained with a tinting strength of 117, in the form of uniform particles with an average diameter of 0.21 microns;

in Comparative Example 1 an orange coloured precipitate was obtained consisting of a heterogeneous mixture of acicular and spherical crystals;

in Comparative Example 2 a brown amorphous precipitate was obtained;

in Comparative Example 3 a red precipitate was obtained with a tinting strength of 108 and in the form of spherical particles which were relatively ununiform compared with those of Example 1;

in Comparative Example 4 a precipitate of red spherical particles of small diameter (0.17 microns) was obtained, with a tinting strength of 115;

in Comparative Example 5 a precipitate of red very ununiform spherical particles of a quite high average diameter (0.30 microns) was obtained, with a tinting strength of 104;

in Comparative Example 6 a precipitate of red very ununiform spherical particles of quite low average diameter (0.14 microns) was obtained, with a tinting strength of 107.

in Comparative Example 7 a partially amorphous brown product was obtained.

in Comparative Examples 4 and 6 the tinting strength was obtained by comparison with the commercial product SIOF C 410; in all the other Examples the commercial product used for comparison purposes was SIOF C 1017.

What we claim is:

1. A process for preparing a red Fe$_2$O$_3$ iron oxide pigment in the form of spherical particles with an average sphere size of 0.1–0.4 microns, starting from ferrous sulphate, an inorganic base and an organic aromatic derivative, comprising:

(a) in a first stage, bringing into contact aqueous ferrous sulphate solution, aqueous alkali metal hydroxide and an aromatic nitro-derivative, with a molar ratio of alkali metal hydroxide to ferrous sulphate equal to or less than 1:1 and a molar ratio of moles of said alkali metal hydroxide to equivalents of aromatic nitro-derivative equal to or less than 12:1, and operating at a temperature between 85° C. and the boiling point of the reaction mixture at atmospheric pressure and at a pH equal to or less than 7.5 for a time at least equal to the time required for forming a suspension of nuclei with a solids content, evaluated as $Fe_2O_3$, of not greater than 40g/liter;

(b) in a second reaction stage, mixing together an aqueous solution of ferrous sulphate, an organic nitro-derivative and iron oxide pigment nuclei from the first stage, and while operating at a temperature between 85° C. and the boiling point of the reaction mixture at atmospheric pressure feeding into the mixture aqueous alkali metal hydroxide up to a maximum of approximately 2 moles for each mole of ferrous sulphate, the ratio of moles of alkaline hydroxide to the equivalents of organic nitro-derivative being equal to or less than about 12:1, said feed of aqueous alkali metal hydroxide being gradual in order to maintain in the reaction medium a pH between 6.0 and 7.5, whereby a suspension of the $Fe_2O_3$ iron oxide pigment with a solids content, evaluated as $Fe_2O_3$, of not greater than 110g/liter is formed, the amount of the nuclei from the first stage being 3 to 15 parts by weight for every 100 parts by weight of the precipitate in the second stage;

(c) recovering the pigmentary iron oxide and the resultant aromatic amine from the reaction products of the second stage.

2. A process as claimed in claim 1, wherein the ferrous sulphate consists of ferrous sulphate heptahydrate obtained as a by-product in the preparation of titanium dioxide by the sulphate process.

3. A process as claimed in claim 1, wherein the alkaline hydroxide is sodium hydroxide.

4. A process as claimed in claim 1, wherein the aromatic nitro-derivative contains one or more nitro groups bonded to an aromatic ring of a compound having one or more aromatic condensed or uncondensed rings.

5. A process as claimed in claim 1, wherein the first stage is carried out with a molar ratio of alkali metal hydroxide to ferrous sulphate of between 0.3:1 and 1:1.

6. A process as claimed in claim 5, wherein the said first stage molar ratio is between 0.4:1 and 0.6:1.

7. A process as claimed in any claim 1, wherein the first stage is carried out at a temperature between 95° C. and the boiling point of the reaction mixture at atmospheric pressure.

8. A process as claimed in claim 1, wherein the first stage is carried out at a pH of 6.5–7.0.

9. A process as claimed in claim 1 wherein the nuclei suspension obtained in the first stage has a solids content, evaluated as $Fe_2O_3$, of between 5 and 40 g/liter.

10. A process as claimed in claim 9, wherein the nuclei suspension solids content is of the order of 10–15 g/liter.

11. A process as claimed in claim 1, wherein the first stage is carried out for a time of between 0.5 and 3 hours.

12. A process as claimed in claim 1, wherein the second stage is carried out with a molar ratio of alkali metal hydroxide to ferrous sulphate of between 0.5:1 and 2:1.

13. A process as claimed in claim 1, wherein the second stage is carried out at a temperature of between 95° C. and the boiling point of the reaction mixture at atmospheric pressure.

14. A process as claimed in claim 1 wherein the second stage is carried out at a pH of 6.5–7.0.

15. A process as claimed in claim 1, wherein in the second stage a suspension is produced with a solids content, evaluated as $Fe_2O_3$, of between 30 and 90 g/liter.

16. A process as claimed in claim 1, wherein the precipitate contains between 5 and 10 parts by weight of nuclei from the first stage per 100 parts by weight of the pigment produced in the second stage.

* * * * *